(12) United States Patent
Joshi

(10) Patent No.: US 7,502,501 B2
(45) Date of Patent: Mar. 10, 2009

(54) SYSTEM AND METHOD FOR RENDERING AN OBLIQUE SLICE THROUGH VOLUMETRIC DATA ACCESSED VIA A CLIENT-SERVER ARCHITECTURE

(75) Inventor: Rajan L. Joshi, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 622 days.

(21) Appl. No.: 11/315,033

(22) Filed: Dec. 22, 2005

(65) Prior Publication Data

US 2007/0147686 A1     Jun. 28, 2007

(51) Int. Cl.
G06K 9/00 (2006.01)

(52) U.S. Cl. .................................. 382/128; 382/240

(58) Field of Classification Search .................. 382/128, 382/131, 240, 248, 282; 709/203; 600/300, 600/407
See application file for complete search history.

(56) References Cited

U.S. PATENT DOCUMENTS 7,447,369 B2 *  11/2008  Gormish et al. ............. 382/235
2005/0065423 A1 *   3/2005  Owen ........................ 600/407

OTHER PUBLICATIONS

Karthik Krishnan et al., Compression/Decompression Strategies for Large Volume Medical Imagery, Medical Imaging 2004: PACS and Imaging Informatics, pp. 152-159.

Jonathan S. Batchelor, www.auntminnie.com, 3D Navigation Holds Promise For Image Overload, Jul. 11, 2005.
Martin Boliek, et al., JPEG 2000—Part 2 020719 (Final Publication Draft) Jul. 19, 2002 Standard Operating Procedure-JPEG 2000 Image Coding System: Extensions (Cover page only).
Majid Rabbani et al., An Overview Of The JPEG 2000 Still Image Compression Standard, Signal Processing: Image Communication 17 (2002) pp. 1-48.
Martin Boliek et al., Coding of Still Pictures- JPEG 2000 Part 1 020719 (Final Publication Draft)—Information Technology, JPEG 2000 Image Coding System (Standard Operating Procedure) (Cover page only).
Information Technology—Information Technology—JPEG 2000 Image Coding System—Part 9: Interactivity Tools, APIs and Protocols, Version 1- ITU Recommendation T.808/ISO/IEC 15444-9:2004 (Standards Catalog) (Cover page only).
Raymond Leung et al., Transform and Embedded Coding Techniques for Maximum Efficiency and Random Accessibility in 3D Scalable Compression, EDICS Category: 1-VIDC, Jul. 1, 2004, pp. 1-29.

* cited by examiner

*Primary Examiner*—Phuoc Tran

(57) ABSTRACT

A system renders oblique slices through volumetric data accessed via a network using a client-server architecture. The system includes a server for processing and storing volumetric data comprising axial slices obtained from a diagnostic scanning system, a client for processing user requests related to specific views of the volumetric data, and a network protocol for connecting the client with the server over the network and obtaining data from the server for use by the client. A processing stage at the client specifies an oblique slice and communicates particulars of the oblique slice to the server, thereupon obtaining axial slice data from the server specifically for portions of the axial slices that are needed to render the oblique slice. Memory at the client stores the axial slice data, and a rendering stage at the client renders the oblique slice from the axial slice data in the memory.

26 Claims, 6 Drawing Sheets

| INDEX OF THE AXIAL SLICE TO BE RENDERED | NUMBER OF SLICES FROM THE WAVELET DOMAIN THAT NEED TO BE DECODED | |
|---|---|---|
| | DECOMPOSITION LEVELS=1 | DECOMPOSITION LEVELS=2 |
| $4n$ | 3 | 5 |
| $4n + 1$ | 5 | 8 |
| $4n + 2$ | 3 | 7 |
| $4n + 3$ | 5 | 8 |
| AVERAGE | 4 | 7 |

| ANGLE OF THE SLICE NORMAL WITH THE Z AXIS | TRANSMITTED COMPRESSED DATA (IN KB) | |
|---|---|---|
| | WITHOUT USING CLIENT-SIDE CACHE | USING CLIENT-SIDE CACHE |
| 15° | 1120 (23.4%) | 1120 (23.4%) |
| 30° | 1187 (24.8%) | 690 (14.42%) |
| 45° | 1188 (24.8%) | 265 (5.5%) |
| 60° | 1188 (24.8%) | 109 (2.3%) |
| 75° | 1188 (24.8%) | 298 (6.2%) |
| COMPRESSED IMAGE SIZE AT THE SERVER (IN KB): 4786 | | |

*FIG. 8*

SYSTEM AND METHOD FOR RENDERING AN OBLIQUE SLICE THROUGH VOLUMETRIC DATA ACCESSED VIA A CLIENT-SERVER ARCHITECTURE

FIELD OF THE INVENTION

The invention relates generally to the field of medical imaging, and in particular to the processing of volumetric data captured by such systems. More specifically, the invention relates to use of a client-server architecture in a medical archiving and communication system.

BACKGROUND OF THE INVENTION

A computerized axial tomography scan (commonly known as a CAT scan or a CT scan) is an x-ray procedure which combines many x-ray images with the aid of a computer to generate cross-sectional views of the internal organs and structures of the body. In each of these views, the body image is seen as an x-ray "slice" of the body. Typically a plurality of parallel slices are taken at different levels of the body, that is, at different axial (z-axis) positions. This recorded image is called a tomogram, and "computerized axial tomography" refers to the recorded tomogram "sections" at different axial levels of the body. In multislice CT, a two-dimensional array of detector elements replaces the linear array of detectors used in conventional CT scanners. The 2D detector array permits the CT scanner to simultaneously obtain tomographic data at different slice locations and greatly increases the speed of CT image acquisition. Multislice CT facilitates a wide range of clinical applications, including 3D imaging, with a capability for scanning large longitudinal volumes with high z-axis resolution.

Magnetic resonance imaging (MRI) is another method of obtaining images of the interior of objects, especially the human body. More specifically, MRI is a non-invasive, non-x-ray diagnostic technique employing radio-frequency waves and intense magnetic fields to excite atoms in the object under evaluation. Like a CAT scan, MRI provides computer-generated image "slices" of the body's internal tissues and organs. As with CAT scans, multislice MRI facilitates a wide range of clinical applications, including 3D imaging, and provides large amounts of data by scanning large volumes with high z-axis resolution.

However, in medical imaging, the popularity of image capture modalities such as multislice CT and MRI is resulting in an exponential increase in the amount of volumetric data that needs to be stored and transmitted. The increased data is taxing the interpretation capabilities of radiologists. One of the recommended workflow strategies for radiologists to overcome the data overload is the use of volumetric navigation (see, e.g., J. S. Batchelor, 3*D navigation holds promise for image overload*, www.auntminnie.com, July 2005). This allows the radiologist to seek a series of oblique slices through the data instead of the more typical axial slices, where each oblique slice intersects a plurality of axial slices. In a typical setup, the volumetric data is stored on a picture archive and communication system (PACS) server, possibly in a compressed form, and a client, such as a diagnostic workstation, requests axial slices from the server. Typical client-server architectures that enable volumetric navigation are as follows:

Server-centric: In this architecture, when a client requests an oblique slice, the server performs required decompression and interpolation to compute the requested oblique slice. Next, the oblique slice image is transmitted to the client (possibly after compression). In this case, the server carries the entire computational load. The client needs very few resources (thin-client). The AquariusNET server by TeraRecon, Inc. is an example of a server using this paradigm.

Client-centric: In this architecture, the client is a full-fledged 3D workstation. Data corresponding to all the axial slices is transmitted from the server to the client. The client uses its 3D capabilities to render the desired oblique slice.

Both of these architectures have certain drawbacks. The main drawback of the server-centric architecture is that, in case of multiple requests, the data transmitted in response to previous requests cannot be reused. Also, the server might be able to service only a limited number of clients as a result of the computational load. One of the chief drawbacks of the client-centric architecture is that, in most cases, the rendering cannot be started until all the slice data is received. With the increasing axial resolution for CT and MRI scans, a single study can easily contain 50-100 megabytes (MB) of data or more. This can result in an unacceptable workflow. Also, this architecture places high demands on the client in terms of memory and computational power.

The increased resolution of CT and MRI data has also sparked interest in compression algorithms for storage and transmission purposes. One such compression algorithm is JPEG2000. JPEG2000 is an emerging international standard, ratified by the International Standards Organization (ISO), for image and video compression. The JPEG2000 standard has several parts. Part 1 of JPEG2000 (refer to *Information Technology—JPEG2000 Image Coding System*, ISO/IEC International Standard 15444-1, ITU Recommendation T.800, 2000) defines a core coding system that is aimed at minimal complexity while satisfying 80% of the applications. Part 2 of JPEG2000 (refer to *Information Technology—JPEG2000 Image Coding System: Part II Extensions*, ISO/IEC International Standard 15444-2, ITU Recommendation T.801, 2001) is aimed at enhancing the performance of Part 1 with more advanced technology, possibly at the expense of higher complexity. In November 2001, the DICOM Working Group 4 (compression group) approved JPEG2000 as an accepted compression option (refer to Digital Imaging and Communications in Medicine (DICOM) *Supplement 61: JPEG2000 Transfer Syntaxes*, 2003). Apart from superior compression performance, desirable features of JPEG2000 for compression of medical images include:

Lossless as well as lossy compression capability.
Capability to work seamlessly for different bit-depth imagery.
Scalability (resolution, quality, and spatial).

JPEG2000 Interactive Protocol (JPIP) is Part 9 of the JPEG2000 standard (refer to *Information Technology—JPEG 2000 image coding system—Part 9: Interactivity tools, APIs and protocols*—(JPIP) Common Text, ISO/IEC 15444-9: 2004, ITU-T Recommendation T.808, wg1n3314, July 2004). It defines a protocol for communication between a client and a server serving JPEG2000-compressed images. The JPIP protocol allows the client to request JPEG2000-compressed data associated with a particular region and resolution.

A good example of a client-server system based on JPEG2000 and JPIP can be seen in the 'kdu_show' application of the 'Kakadu' software package developed by David Taubman (D. Taubman, *Kakadu Software*, available at www.kakadusoftware.com). Krishanan et al. proposed a scheme for JPIP supported interactive browsing of large volume medical imagery (K. Krishnan, M. W. Marcellin, A.

Bilgin, and M. Nadar, "Compression/Decompression Strategies for Large Volume Medical Imagery," *Medical Imaging 2004: PACS and Imaging Informatics*, Proc. SPIE Vol. 5371, pp. 152-159, San Diego, Calif., February 2004). Version 5.0 of the Kakadu software has introduced support for this feature. However, the limitation of this method is that the region of interest is restricted to be a cuboid. Hence, the framework is not very suitable for obtaining arbitrary oblique slices from the server.

While such systems may have achieved certain degrees of success in their particular applications, there is a need for new client-server architectures that are more responsive to the needs of the end user, particularly a user who is attempting to use and control the data to obtain a desired oblique slice of a 3D volume.

SUMMARY OF THE INVENTION

An object of the present invention is to provide a client-server architecture that renders oblique slices through 3D volumetric data stored remotely at the server.

Another object of the present invention is to provide a client-centric architecture that is more responsive to the requests from the end user by transmitting data to the client on an as-needed basis.

A further object of the present invention is to store data at the server in a JPEG2000-compressed form and to use the JPIP protocol for obtaining JPEG2000-compressed data from the server.

A further object of the present invention is to further partition the JPEG2000-compressed data into smaller structures, such as precincts, and then to use only the compressed data from those certain precincts that are needed to render the slice.

A further object of the present invention is to provide a server that can minimize bandwidth by transmitting only relevant compressed data that is not already stored at the client.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, a system renders oblique slices through volumetric data accessed via a network using a client-server architecture. The system includes a server for processing and storing volumetric data comprising axial slices obtained from a diagnostic scanning system, a client for processing user requests related to specific views of the volumetric data, and a network protocol for connecting the client with the server over the network and obtaining data from the server for use by the client. A processing stage at the client specifies an oblique slice and communicates particulars of the oblique slice to the server, thereupon obtaining axial slice data from the server specifically for portions of the axial slices that are needed to render the oblique slice. Memory at the client stores the axial slice data already received, and a rendering stage at the client renders the oblique slice from the axial slice data in the memory.

In a further aspect of the invention, the processing stage at the client specifies a position of the oblique slice, identifies portions of the axial slices that are needed to render the oblique slice, and requests needed axial slice data from the server specifically comprising the portions of the axial slices identified by the client that are needed to render the oblique slice. In yet another variation, the processing stage at the client generates an equation of a plane comprising the oblique slice and communicates the equation of the plane to the server, which identifies portions of the axial slices that are needed to render the oblique slice, whereby the client then obtains the portions of the axial slice data from the server.

More specifically, according to another aspect of the invention, a method for rendering oblique slices according to the system described above uses JPEG2000 compression to transform volumetric data from a diagnostic scanning system into wavelet coefficients that are grouped into precincts. The method includes the steps of (a) processing and storing JPEG2000-compressed volumetric data at the server, wherein the volumetric data comprises axial slices obtained from a diagnostic scanning system; (b) connecting the client with the server over the network according to a JPIP protocol; (c) specifying an oblique slice within the volumetric data; (d) identifying wavelet coefficients in the axial slices that are needed to render the oblique slice; (e) requesting compressed data belonging to specific precincts from the server, wherein the specific precincts include the wavelet coefficients that are needed to render the oblique slice, whereby the specifying, identifying and requesting steps occur at the client; (f) storing the compressed data belonging to the specific precincts in memory at the client; and (h) rendering the oblique slice from the wavelet coefficients included in the compressed data belonging to the specific precincts in the memory.

More specifically, according to yet another aspect of the invention, a method for rendering oblique slices according to the system described above uses JPEG2000 compression to transform volumetric data from a diagnostic scanning system into wavelet coefficients that are grouped into precincts. The method includes the steps of (a) processing and storing JPEG2000-compressed volumetric data at the server, wherein the volumetric data comprises axial slices obtained from the diagnostic scanning system; (b) connecting the client with the server over the network according to a JPIP protocol; (c) specifying the position of an oblique slice within the volumetric data; (d) deriving an equation of a plane that contains the oblique; (e) utilizing the equation to identify wavelet coefficients in the axial slices that are needed to render the oblique slice; (f) obtaining compressed data belonging to specific precincts from the server, wherein the specific precincts include the wavelet coefficients that are needed to render the oblique slice, whereby the specifying and deriving steps occur at the client and the utilizing step occurs at the server; (g) storing the compressed data belonging to the specific precincts in memory at the client; and (h) rendering the oblique slice from the wavelet coefficients included in the compressed data belonging to the specific precincts in the memory.

In another aspect, the methods as described above further comprise the steps of determining if any of the requested precincts are already stored in the memory at the client and transmitting compressed data belonging to only new precincts that are not already in the memory, whereby the step of rendering utilizes compressed data belonging to both new precincts and precincts already stored in the cache memory.

This disclosure describes a new client-server architecture based on the JPEG2000 compression standard and the JPIP protocol. In the disclosed architecture, the end user can request an arbitrary oblique slice through the data. In the preferred embodiment of the disclosed architecture, only the compressed data that is necessary to render the requested slice is transmitted from the server to the client. While the disclosed architecture has some similarities to the client-centric architecture described above, its advantage is that it is more responsive to the end user who is controlling the positioning of the oblique slice. This is accomplished by prioritizing data transmission based on the relevance of the data to the current position of the oblique slice.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 8 shows a table illustrating the savings in transmitted bytes with the described architecture, as presently disclosed according to the invention.

DETAILED DESCRIPTION OF THE INVENTION

Because medical imaging systems employing diagnostic imaging devices (such as CT and MRI devices) and related circuitry and software for diagnostic image processing are well known, the present description will be directed in particular to elements forming part of, or cooperating more directly with, system and method in accordance with the present invention. Elements not specifically shown or described herein may be selected from those known in the art. Certain aspects of the embodiments to be described may be provided in software. Given the system and method as shown and described according to the invention in the following materials, software not specifically shown, described or suggested herein that is useful for implementation of the invention is conventional and within the ordinary skill in such arts. In such implementations, the software may be embodied in a computer program product.

A computer program product may include one or more storage media, for example; magnetic storage media such as a magnetic disk (such as a floppy disk) or a magnetic tape; optical storage media such as an optical disk, an optical tape, or a machine readable bar code; solid-state electronic storage devices such as a random access memory (RAM), or a read-only memory (ROM); or any other physical device or media employed to store a computer program having instructions for controlling one or more computers to practice the method according to the present invention.

As described herein, a client-server system and architecture includes a client component and a server component. These terms take on their conventional meaning. For instance, a client is a computer that receives services from another computer, or (on multitasking operating systems) a process that receives services from another process. The machine or process that is supplying the services is called the server. Consequently, the server is a computer that provides services to another computer (called the client). On multitasking machines, a process that provides services to another process is sometimes also called a server. For example, a PACS computer running a web or network browser is a client; the PACS machines from which web or network files are downloaded are servers.

The overall organization of the present detailed description is as follows. First, there is a brief overview of Part 1 of the JPEG2000 standard and JPIP. The additional features enabled by Part 2 of the JPEG2000 standard are pointed out whenever appropriate. Then, the presently disclosed client-server architecture is described as based on the JPEG2000 compression standard and the JPIP protocol. Next, the implementation of the presently disclosed client-server architecture within the JPIP framework is discussed. Finally, simulation results are discussed.

1. Brief Overview of JPEG2000 and JPIP.

Figure 1:
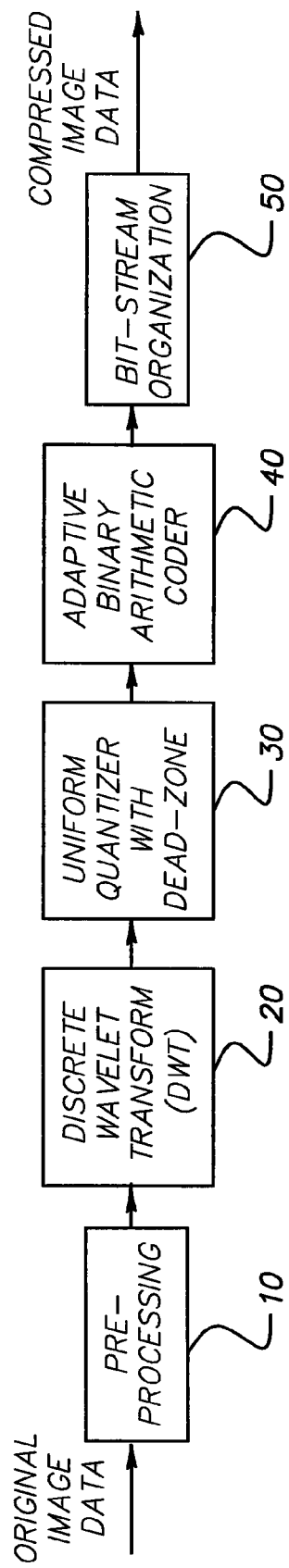
FIG. 1 shows a simplified block diagram of a JPEG2000 encoder, as known in the prior art.

FIG. 1 shows a simplified block diagram of a JPEG2000 encoder. A pre-processing unit 10 tiles the input image data, shifts unsigned image components to make them zero mean, and if desired, applies a forward pointwise transform to the image components (e.g., R, G, B components) to de-correlate the image components. Part 1 of the JPEG2000 standard permits only two forward pointwise transforms, one reversible and the other irreversible, which may be applied across the first three components of a multi-component image. Part 2 allows more general pointwise transforms. The thus-processed input image is next input to a discrete wavelet transform (DWT) unit 20, which decomposes the input image into subbands. The filtered samples that are output from the DWT unit 20 are referred to as subband or wavelet coefficients. The resulting subband or wavelet coefficients undergo quantization with a uniform dead-zone quantizer 30. The quantized coefficients are grouped into precincts and codeblocks. Each codeblock is encoded independently by an entropy coder 40 to produce a compressed bit-stream corresponding to that codeblock. A packet formation and bit-stream organization unit 50 divides the compressed codeblock bit-stream into layers and aggregates the appropriate layer from different codeblocks into packets. It also decides the order in which the packets should appear in the compressed bit-stream. The JPEG2000 decoder (not shown) essentially reverses the operations performed by the JPEG2000 encoder. Now the functions of blocks of the JPEG2000 encoder, which are relevant to the presently disclosed client-server system, will be described in greater detail.

Figure 2:
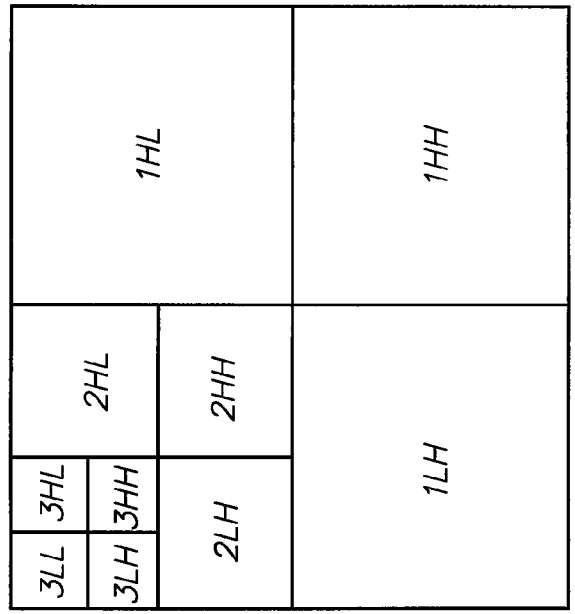
FIG. 2 shows a subband diagram of 3-level, 2-D discrete wavelet transform (DWT) decomposition and the corresponding labeling for each subband, as known in the prior art.

JPEG2000 employs a two-dimensional (2-D) discrete wavelet transform (DWT). The DWT unit 20 transforms the input image into wavelet coefficients, which are grouped into subbands. Part 1 of the JPEG2000 standard has adopted only two choices for the DWT filters. One is the Daubechies (9,7) filter-bank also known as the irreversible (9,7) filter-bank, which can be used only for lossy compression. The other is the (5,3) filter-bank, also referred to as the reversible (5,3) filter-bank, which can be used for lossy or lossless coding. Part 2 of JPEG2000 allows more filter choices including user-specified filters. But any set of filters used has to satisfy the perfect reconstruction property. The basic 2-D DWT is obtained by separably applying a one-dimensional (1-D) DWT to rows and columns. A single level of 2-D DWT produces 4 subbands, namely, LL, HL, LH, and HH, where the L and H notation indicate the filtering applied to rows and columns. For example, the subband label HL indicates that a horizontal high-pass (H) filter has been applied to the rows, followed by a vertical low-pass (L) filter applied to the column. In part 1 of JPEG2000, additional levels of decomposition are obtained by splitting the LL subband recursively. FIG. 2 shows a 3-level, 2-D DWT and the corresponding labeling for each subband. As a convention, the subband 0LL refers to the original image. Part 2 of JPEG2000 allows more general decompositions where the HL, LH, and HH subbands may be split further.

The DWT decomposition provides a natural multi-resolution representation. The lowest resolution at which the image can be reconstructed is referred to as resolution zero. For example, referring to FIG. 3, the 3LL subband would correspond to resolution zero for a 3-level decomposition. For an N-level DWT decomposition, the image can be reconstructed at N+1 resolutions. In general, to reconstruct an image at resolution r (r>0), subbands (N−r+1)HL, (N−r+1)LH, and (N−r+1)HH need to be combined with the image at resolution (r−1). These subbands are referred to as belonging to resolution r. Resolution 0 consists of only the NLL band.

Each wavelet coefficient is quantized with the uniform dead-zone scalar quantizer 30 to produce a sign-magnitude representation of the indices of quantized coefficients. Part 1 of the JPEG2000 standard mandates the use of a single quantizer step-size for all the coefficients in a given subband. But the step-size can vary from subband to subband.

The quantized subband coefficients are partitioned into codeblocks. Codeblock is the most basic grouping of wavelet coefficients. JPEG2000 also permits other higher-level groupings, such as precincts and tiles. Quantized wavelet coefficients from each codeblock are independently encoded by the entropy coder 40. In JPEG2000, the MQ arithmetic coder is used as the entropy coder. The entropy coder 40 encodes the sign-magnitude representation of the codeblock coefficients as bit-planes. Each bit-plane is encoded in one or more coding passes. The most significant bit-plane is encoded using a single coding pass, known as the cleanup pass. The remaining bit-planes are encoded using three passes, namely, significance propagation pass, refinement pass, and cleanup pass.

Figure 3:
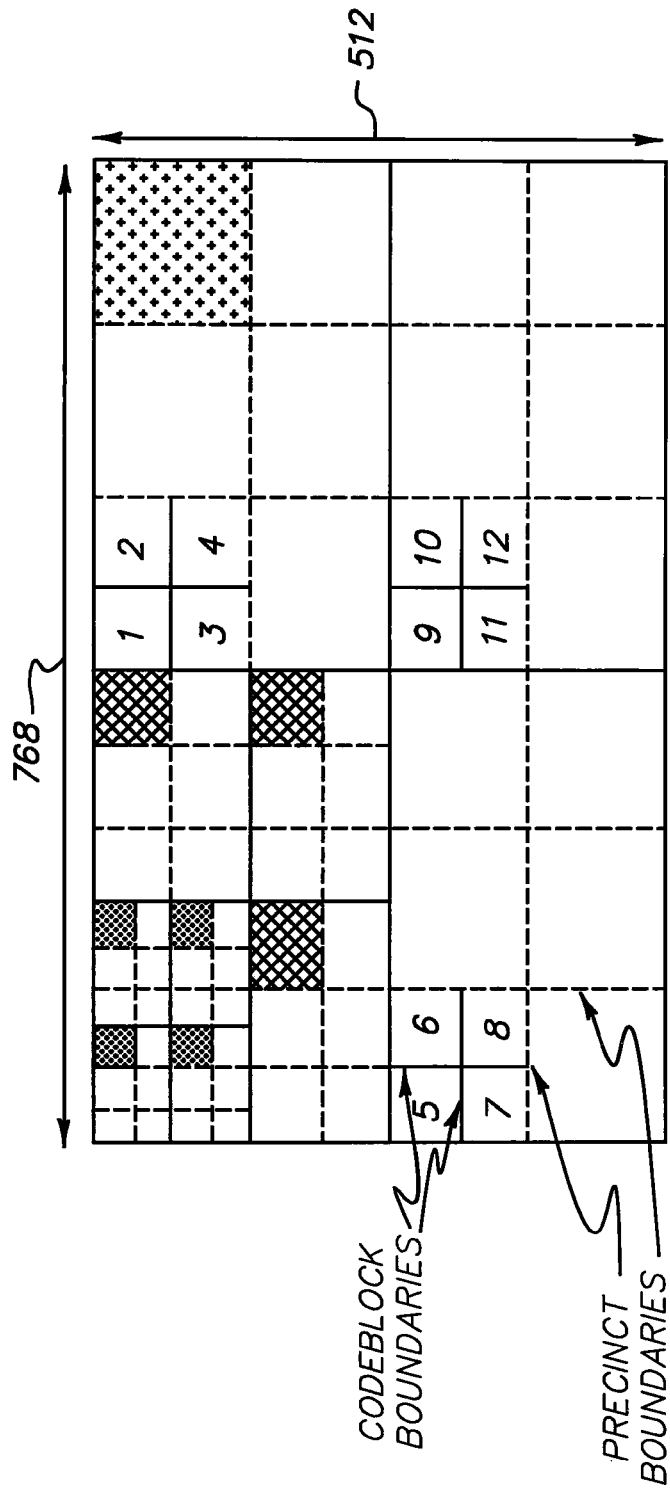
FIG. 3 shows an example of precincts and codeblocks in a subband diagram of the type shown in FIG. 2.

Codeblocks can be viewed as a tiling of the coefficients in the wavelet domain. JPEG2000 also provides an intermediate space-frequency structure known as a precinct. A precinct is a collection of spatially contiguous codeblocks from all subbands at a particular resolution level. Normally, the precinct size and partition is specified with respect to a specific resolution. This induces a precinct partition in each of the subbands belonging to that resolution. Although the codeblock size is nominally constant, for each subband it is upper bounded by the size of the induced precinct partition. FIG. 3 shows an example of precincts and codeblocks for a 768 (columns)×512 (rows) image. The nominal codeblock size is 64×64. The precinct sizes for resolutions 0-3 are 32×32, 64×64, 128×128, and 256×256, respectively. The highlighted precincts in resolutions 0-3 correspond roughly to the same 256×256 region in the original image.

JPEG2000 organizes the compressed data from the codeblocks into units known as packets and layers. In the packet formation and bit-stream organization unit 50, the compressed bit-stream for each codeblock is distributed across one or more layers in the compressed bit-stream. All of the codeblocks from all of the subbands and components of a tile contribute compressed data to each layer. For each codeblock, a number of consecutive coding passes (including zero) is included in a layer. Each layer represents a quality increment. The number of coding passes included in a specific layer can vary from one codeblock to another, and is typically determined by the encoder. The compressed data belonging to a specific tile, component, resolution, layer, and precinct is aggregated into a packet.

Numerous papers known to those of skill in this art provide a more detailed discussion of the JPEG2000 compression standard. For instance, reference may be made to the tutorial paper entitled "An overview of the JPEG2000 still image compression standard", M. Rabbani and R. Joshi, *Signal Processing: Image Communication,* 17 (1), pp. 3-48, 2002 for further details of the JPEG2000 compression standard.

JPEG 2000 provides a lot of flexibility with respect to random access, codestream reordering and incremental decoding. The JPEG2000 committee realized that in order to exploit these features in a networked environment it is necessary to define a protocol for efficient exchange of JPEG2000 imagery and metadata. The JPIP protocol, which is Part 9 of the JPEG2000 standard, defines client-server interactions to achieve this. The client uses a View-Window request to define the resolution, size, location, components, layers, and other parameters for the image and metadata that is requested by the server. JPIP may be implemented on top of HTTP, but is designed with a view to other possible transports. JPIP can deliver pieces of a JPEG 2000 image in essentially arbitrary order, in response to real-time application requests. This is achieved by introducing two new stream media types, namely, JPP-stream and JPT-stream. The JPP-stream media type is associated with precinct data-bins. Similarly, The JPT-stream media type is associated with tile data-bins. The practice of this invention, according to a preferred embodiment, concentrates on precinct data-bins and JPP-streams.

2. New Client-Server Architecture Based on JPEG2000 and the JPIP Protocol.

Figure 4:
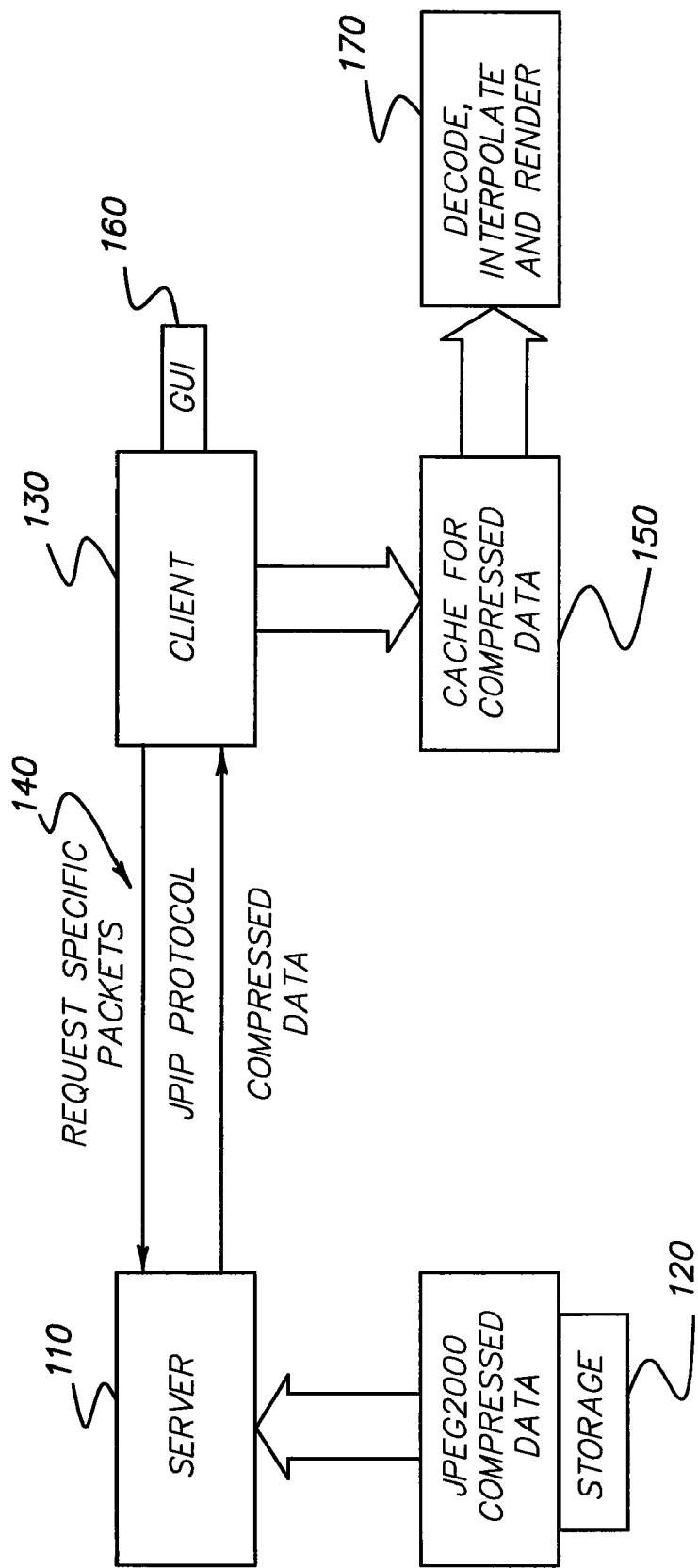
FIG. 4 shows a block diagram of the architecture for the client-server system according to the invention.

FIG. 4 shows a block diagram of the proposed architecture. A server 110 stores JPEG2000-compressed volumetric data in storage media 120. Each axial slice of volumetric data may be compressed independently using JPEG2000. Alternatively, in a more general scenario, a decorrelating point transform may be first applied in the axial direction. The decorrelating transform can be a linear block transform or a wavelet transform as in Part 2 of JPEG2000. After the decorrelating transform has been applied, each thus-transformed axial slice of volumetric data is compressed independently using JPEG2000. If the axial transform is an identity transform, the more general scenario reduces to independently compressing axial slices. Accordingly, in the present disclosure of the invention, the more general scenario will be invoked unless otherwise indicated. A JPEG2000 client 130 communicates with the JPEG2000 server 110 over a network 140 using the JPIP protocol. The client 130 can ask for compressed data from specific resolutions and (or) regions of the image. The client 130 also maintains a cache memory 150 that stores compressed data relating to a particular image or group of slices previously received by the client 130. The client 130 also provides a graphical user interface (GUI) 160 that allows an end-user to request one or more oblique slices through the volumetric data. An interpolation and rendering engine 170 periodically renders the desired oblique slice from the compressed data stored in the cache memory 150. To successfully implement this architecture, it is necessary to solve two technical problems. The first one is the identification of wavelet coefficients that are needed for successful rendering of an oblique slice, which is dealt with in sections 2.1 through 2.2 below. The second problem is communication of this information from the client to the server within the framework of the JPIP protocol, which is dealt with in section 3.

2.1. Identification of Wavelet Coefficients Needed for Rendering an Oblique Slice.

Let the volumetric image be denoted by v and let the dimensions of v be W×H×D. Let the spacing between points in the X, Y, and z directions be denoted by $s_x$, $s_y$, and $s_z$, respectively. It will be assumed that axial slices are organized parallel to the XY plane, thereby making z the axial direction. The volume is bounded by the planes $x=-0.5s_x$, $x=(W-0.5)s_x$, $y=-0.5s_y$, $y=(H-0.5)s_y$, $z=-0.5s_z$, and $z=(D-0.5)s_z$. Here it is implicitly assumed that the center of each voxel lies at integer coordinates. Let the plane which contains the desired oblique slice be denoted by P. To render the oblique slice, it is necessary to choose a sampling lattice that spans P. This can be accomplished by choosing an origin $O=(O_x, O_y, O_z) \in P$, and choosing orthogonal unit vectors $u_1^P$ and $u_2^P$ belonging to P. Let $s = mm(s_x, s_y, s_z)$. Then, the sampling lattice $N^P$ is chosen to be $$N^P = \{O + n_1 s u_1^P + n_2 s u_2^P, n_1, n_2 \in Z\}, \quad (1)$$

where Z is the set of integers. Here the spacing between the points in the $u_1^P$ and $u_2^P$ directions is chosen to be s. In practice, typically, $s_x = s_y < s_z$. Thus, $s = s_x = s_y$.

For rendering the oblique slice, it is necessary to evaluate pixel values only for pixels that lie within the volume. That is, all points $n=(n_x, n_y, n_z) \in N^P$ that also satisfy $-0.5s_x \leq n_x \leq (W-0.5)s_x, -0.5s_y \leq n_y \leq (H-0.5)s_y$, and $-0.5s_z \leq n_z \leq (D-0.5)s_z. \quad (2)$ Let such a subset of the sampling lattice be denoted by $N_V^P$. The task of determining the wavelet coefficients that are needed for rendering the oblique slice P can be accomplished in three steps:

1. For a given interpolation method, identify the voxels from volumetric image V that are necessary to render the points in $N_V^P$. Let this set be denoted by $B_V(P,I)$, where I denotes the interpolation method.
2. If an axial transform is performed across slices, identify transform coefficients that are needed to render voxels in the set $B_V(P,I)$. Let the set of these transform coefficients be denoted by $B_V(P,T,I)$, where T is the axial transform.
3. Identify precincts from the JPEG2000 compressed slice data that are needed to reconstruct transform coefficients belonging to $B_V(P,T,I)$.

2.1.1. Identification of Voxels Needed for Rendering $N_V^P$ using a Specific Interpolation Method.

For each point $n \in N_V^P$, a set, $B(n,I)$, of voxels is identified from the volumetric image v that are needed to reconstruct n. This process is illustrated through a few examples. Consider that $s_x = s_y = s_z = 1.0$ and $n=(7.3, 8.7, 2.2)$. Then, for nearest neighbor interpolation, $$B(n,I) = \{(7.0, 9.0, 2.0)\}. \quad (3)$$

Similarly, for tri-linear interpolation, $$B(n, I) = \left\{ \begin{array}{l} (7.0, 8.0, 2.0), (7.0, 8.0, 3.0), (7.0, 9.0, 2.0), (7.0, 9.0, 3.0), \\ (8.0, 8.0, 2.0), (8.0, 8.0, 3.0), (8.0, 9.0, 2.0), (8.0, 9.0, 3.0) \end{array} \right\} \quad (4)$$

The set of all voxels from the volumetric image V, which are needed to render the oblique slice P is $$B_V(P, I) = \bigcup_{n \in N_V^P} B(n, I). \quad (5)$$

2.1.2. Identification of Axial Transform Coefficients Needed for Reconstructing $B_V(P,I)$.

Let the linear block transform or wavelet transform in the axial direction be denoted by T. As discussed previously, if no axial transform is performed, the transform T can be thought of as identity transform. It is necessary to determine how to augment the set $B(n,I)$ in the axial direction to account for the inverse transform or wavelet synthesis operation. Let the set of coefficients from axially transformed slices necessary to reconstruct a point $n \in N_V^P$ be denoted by $B(n,T,I)$. $B(n,T,I)$ can then be derived from $B(n,I)$ in case of a linear block transform and a wavelet transform, as follows.

First, consider that a linear block transform T is applied to a group of R slices. In that case, the transform T is a R×R matrix. Let $T^{-1}$ be the inverse transform and let $(T^{-1})_{ij}$ denote the element from the $i^{th}$ row and $j^{th}$ column of $T^{-1}$. Without loss of generality, consider that the transform is applied to slices with indices in the range [0,(R-1)]. In that case, for a point $q=(q_x,q_y,q_z) \in B(n,I)$, all the points $r=(q_x,q_y,r)$ such that $0 \leq r \leq (R-1)$, $r \in Z$, and $(T^{-1})_{q_2 r} \neq 0$, are augmented to the set $B(n,I)$. This process is repeated for each point $q \in B(n,I)$ to produce the set $B(n,T,I)$. Please note that if T is an identity transform, both T and $T^{-1}$ are identity matrices. In that case, $B(n,T,I)=B(n,I)$.

Figures 5, 6:
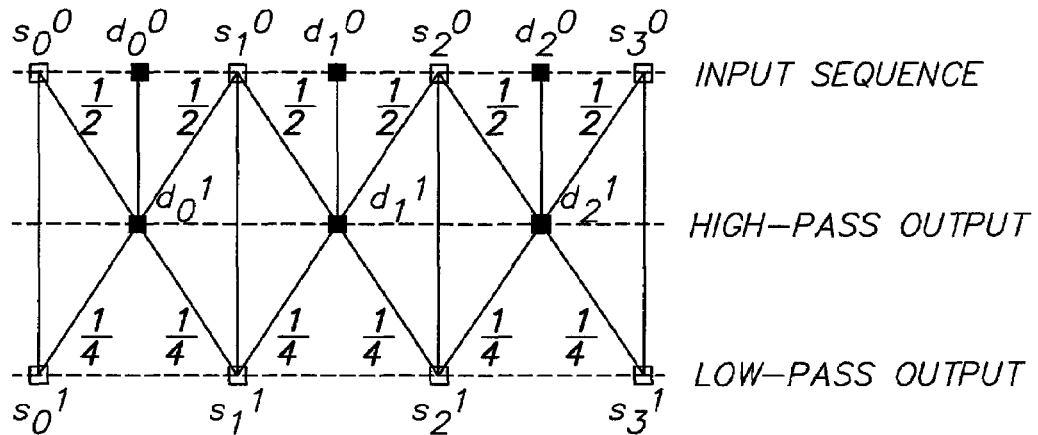
FIG. 5 shows a lifting diagram for one level of wavelet decomposition using a (5,3) filter pair.
FIG. 6 shows a table that indicates the number of slices from the wavelet domain that need to be decoded to render an axial slice for different levels of axial wavelet decomposition using the (5,3) filters, as shown in FIG. 5.

Now consider that a wavelet transform is applied in the axial direction. Then, it is necessary to identify all the wavelet coefficients that are needed to synthesize or reconstruct each point in the set $B(n,I)$. This depends on a number of factors such as the levels of wavelet decomposition in the axial direction, the specific wavelet filters used, and the slice index. For example, consider a one level wavelet decomposition in the axial direction. FIG. 5 shows the lifting diagram for one level of wavelet decomposition using the (5,3) filter pair. The low pass wavelet coefficients $(s_0^1, s_1^1, s_2^1, \ldots)$ are interleaved with the high pass wavelet coefficients $(d_0^1, d_1^1, d_2^1, \ldots)$. Here the superscript denotes the level of the wavelet decomposition and the subscript is related to the index of the wavelet coefficient in the respective subband. The wavelet coefficients undergo the operations shown in the lifting diagram to produce the reconstructed voxels $(s_0^0, d_0^0, s_1^0, d_1^0, s_2^0, d_2^0, \ldots)$. Here $s_n^0$ denotes a slice with even index and $d_n^0$ denotes a slice with an odd index. From the diagram it can be seen that to reconstruct $s_n^0$, wavelet coefficients $\{s_{n-1}^1, d_{n-1}^1, s_n^1, d_n^1, s_{n+1}^1\}$ are needed. Similarly, to reconstruct $d_n^0$, wavelet coefficients $\{s_n^1, d_n^1, s_{n+1}^1\}$ are needed. Thus, for one level of wavelet decomposition in the axial direction, to reconstruct a single slice, on average, four transform slices are necessary. This analysis can be extended to two or more levels of wavelet decomposition and different choice of wavelet filters as described by Leung and Taubman (refer to R. Leung and D. Taubman, (submitted, February 2004) "Transform and embedded coding techniques for maximum efficiency and random accessibility in 3D scalable compression," submitted to *IEEE Transactions on Image Processing*, February 2004). FIG. 6 shows a table that indicates the number of slices from the wavelet domain that need to be decoded to render an axial slice for different levels of axial wavelet decomposition with the (5,3) filters. In particular, the table indicates the number of slices that need to be decoded to reconstruct a slice in the case of a two level wavelet transform in the axial direction with the (5,3) filters.

Thus in case of an axial wavelet transform, for a point $q=(q_x,q_y,q_z) \in B(n,I)$, all the wavelet coefficients for the axially transformed slices that are necessary to reconstruct q are identified and augmented to the set $B(n,I)$. This process is repeated for each point $q \in B(n,I)$ to produce the set $B(n,T,I)$. Finally, the set of transform coefficients from axially transformed slices that are needed to render voxels in the set $B_V(P,I)$ is $$B_V(P, T, I) = \bigcup_{n \in N_V^P} B(n, T, I). \qquad (6)$$

2.1.3 Identifying Precincts Needed to Reconstruct Transform Coefficients in $B_V(P,T,I)$.

Before describing how to identify the precincts, it is useful to define the concept of region of support in the context of a 2D wavelet transform. Consider an original axial slice or an axially transformed slice that is compressed using JPEG2000. JPEG2000 performs a two-dimensional (2D) wavelet decomposition of the input slice. The reconstructed slice can be represented as a weighted linear combination of the synthesis basis functions (refer to M. Rabbani and R. Joshi, "An overview of the JPEG2000 still image compression standard," Signal Processing: *Image Communication*, 17(1), pp. 3-48, 2002). The weights are the values of the 2D wavelet coefficients. There is a basis function associated with each wavelet coefficient position. The region of support for a wavelet coefficient w, ROS(w), is defined as the set of pixels in the spatial domain whose reconstruction is affected by the wavelet coefficient. Let the region of support of wavelet coefficient w be denoted by ROS(w). In more technical terms, ROS(w) is the extent of the synthesis basis function corresponding to the wavelet coefficient w. The definition of region of support can be extended to a set of wavelet coefficients. The region of support for a set w of wavelet coefficients is $$ROS(W) = \bigcup_{w \in W} ROS(w). \qquad (7)$$

Please note that wavelet coefficients in the set W can come from multiple subbands. This is useful as JPEG2000 precincts can have contributions from multiple subbands. Since JPIP protocol allows the server to transmit data related to each precinct in a separate data-bin, it is useful to identify the region of support for each precinct.

Consider a one level 2-D wavelet decomposition with the (5,3) filter-bank. Consider a precinct c at resolution level 1 and let the induced precinct in the HL subband at resolution 1 be $C_{HL}$. Let the corners of $C_{HL}$ be $(m_1,n_1)$, $(m_1,n_2)$, $(m_2,n_1)$, and $(m_2,n_2)$, where m is the column index and n is the row index. Consider a lifting diagram in the row direction. Since the HL subband represents high-pass samples in the row direction, the sample $(m_1,n_1)$ can be thought of as $d_{m_1}^1$ in FIG. 5. It can be seen that $d_{m_1}^1$ affects the reconstruction of columns $\{s_{m_1}^0, d_{m_1}^0, s_{m_1+1}^0\}$. Similarly, the HL subband represents low-pass samples in the column direction. Hence the sample $(m_1,n_1)$ can be thought of as $s_{n_1}^1$ in FIG. 5, for filtering in the column direction. It can be seen that $s_{n_1}^1$ affects the reconstruction of rows $\{s_{n_1-1}^0, d_{n_1}^0, s_{n_1}^0, d_{n_1+1}^0, s_{n_1+1}^0\}$. Reverting to normal indexing instead of the (s, d) notation, the region of support of the point $(m_1,n_1)$ in the HL subband is a rectangle whose corners are $(2m_1, 2n_1-2)$, $(2m_1+2, 2n_1-2)$, $(2m_1, 2n_1+2)$, and $(2m_1+2, 2n_1+2)$. By repeating this process for every point in $C_{HL}$ and taking a union of the regions of support, the region of support for $C_{HL}$ is determined to be a rectangle whose corners are $(2m_1, 2n_1-2), (2m_2+2, 2n_1-2)$, $(2m_1, 2n_2+2)$, and $(2m_2+2, 2n_2+2)$. A similar calculation can be performed for $C_{LH}$ and $C_{HH}$ to show that the region of support for $C_{LH}$ is a rectangle whose corners are $(2m_1-2, 2n_1)$, $(2m_2+2, 2n_1)$, $(2m_1-2, 2n_2+2)$, and $(2m_2+2, 2n_2+2)$. Similarly, region of support for $C_{HH}$ is $(2m_1, 2n_1)$, $(2m_2+2, 2n_1)$, $(2m_1, 2n_2+2)$, and $(2m_2+2, 2n_2+2)$. Thus, the region of support for precinct C is a rectangle whose corners are $(2m_1-2, 2n_1-2)$, $(2m_2+2, 2n_1-2)$, $(2m_1-2, 2n_2+2)$, and $(2m_2+2, 2n_2+2)$.

Now compressed data from precinct c is necessary to render oblique slice P only if $$ROS(C) \cap B_V(P,T,I) \neq NULL. \qquad (8)$$

Similar analysis can be performed for different levels of wavelet decomposition and different wavelet filters as described by the above-cited Leung and Taubman article. The region of support for each precinct from each slice is calculated once and stored for later use in case the position of the oblique slice is changed interactively by the end-user on the client side.

A client using JPIP is restricted to asking for compressed data at precinct granularity. It cannot ask for specific codeblocks within a precinct, even though not all the codeblocks from the precinct may be necessary for rendering an oblique slice. The rendering engine can make use of this information to decode only those codeblocks that are necessary for rendering the desired oblique slice. It is possible to identify the necessary codeblocks with a method analogous to the one described above in case of precincts.

2.2 Alternative Method for Identifying the Precincts Needed for Rendering the Oblique Slice.

It may appear that verifying Eq. 8 for each precinct may be computationally expensive. This is because the set $B_V(P,T,I)$ can contain a large number of elements depending on the position and orientation of the oblique slice plane P. But if precinct c belongs to slice k, it is necessary to evaluate Eq. 8 only for those points from the set $B_V(P,T,I)$ that belong to slice k. Furthermore, the verification of Eq. 8 can be abandoned as soon as a point $b \in B_V(P,T,I)$ is found such that $b \in ROS(C)$. Still, it is desirable to develop a more efficient method for determining whether a precinct is necessary to render an oblique slice.

For simplicity, it will be assumed that no transform is being applied in the axial direction. Consider the intersection of the oblique slice plane P with an axial slice $A_k$ with index $k \in Z$. The equation of the axial slice plane $A_k$ is $z=k*s_z$. The intersection of the oblique slice plane P and the axial slice plane $A_k$ is a straight line, denoted by $L_k$. Let it be assumed that the intersection of $L_k$ with the axial slice $A_k$ is non-empty. Let the equation of the line $L_k$ in the plane of the axial slice k be $\alpha x + by + c = 0$. As before, consider precinct C such that ROS(C) is a rectangle whose corners are $(2m_1-2, 2n_1-2)$, $(2m_2+2, 2n_1-2)$, $(2m_1-2, 2n_2+2)$, and $(2m_2+2, 2n_2+2)$. Then, the compressed data from precinct C is necessary to render oblique slice plane P if line $L_k$ intersects ROS(C). This is true only approximately since this does not take the interpolation into account. Depending on the interpolation method used, a small neighborhood of voxels is needed for reconstructing a point on the oblique slice. To account for the specific interpolation method being used, it is sufficient to expand the region of support for precinct c in all three dimensions. Thus instead of being a rectangle, the expanded region of support is a cuboid. The amount of expansion depends the interpolation method. The basic idea is that if a point belonging to the lattice $N^P$ is outside the expanded region of support, its reconstruction does not depend on any voxels from ROS(C). Let the expanded region of support be denoted by $ROS^1(C)$, where the superscript I denotes the interpolation method. Then, for nearest neighbor interpolation, the expanded region of interest, $ROS^1(C)$, is specified by $$(2m_1-2-0.5)s_x \leq x \leq (2m_2+2+0.5)s_x,$$

$$(2n_1-2-0.5)s_y \leq y \leq (2n_2+2+0.5)s_y,$$

$$(k-0.5)s_z \leq z \leq (k+0.5)s_z. \quad (9)$$

Similarly, for tri-linear interpolation, $ROS^1(C)$, is specified by $$(2m_1-2-1)s_x \leq x \leq (2m_2+2+1)s_x,$$

$$(2n_1-2-1)s_y \leq y \leq (2n_2+2+1)s_y,$$

$$(k-1)s_z \leq z \leq (k+1)s_z. \quad (10)$$

Compressed data from precinct C is not necessary to render oblique slice plane P if $$ROS^1(C) \cap P = NULL. \quad (11)$$

The converse is not strictly true since to render the oblique slice, only points on the sampling lattice $N^P$ need to be rendered. In practice, using Eq. 11 to decide whether a precinct is needed results in negligible increase in the number of precincts requested from the server.

3. Implementation of the Client-Server Architecture within the Framework of the JPIP Protocol.

Figure 7:
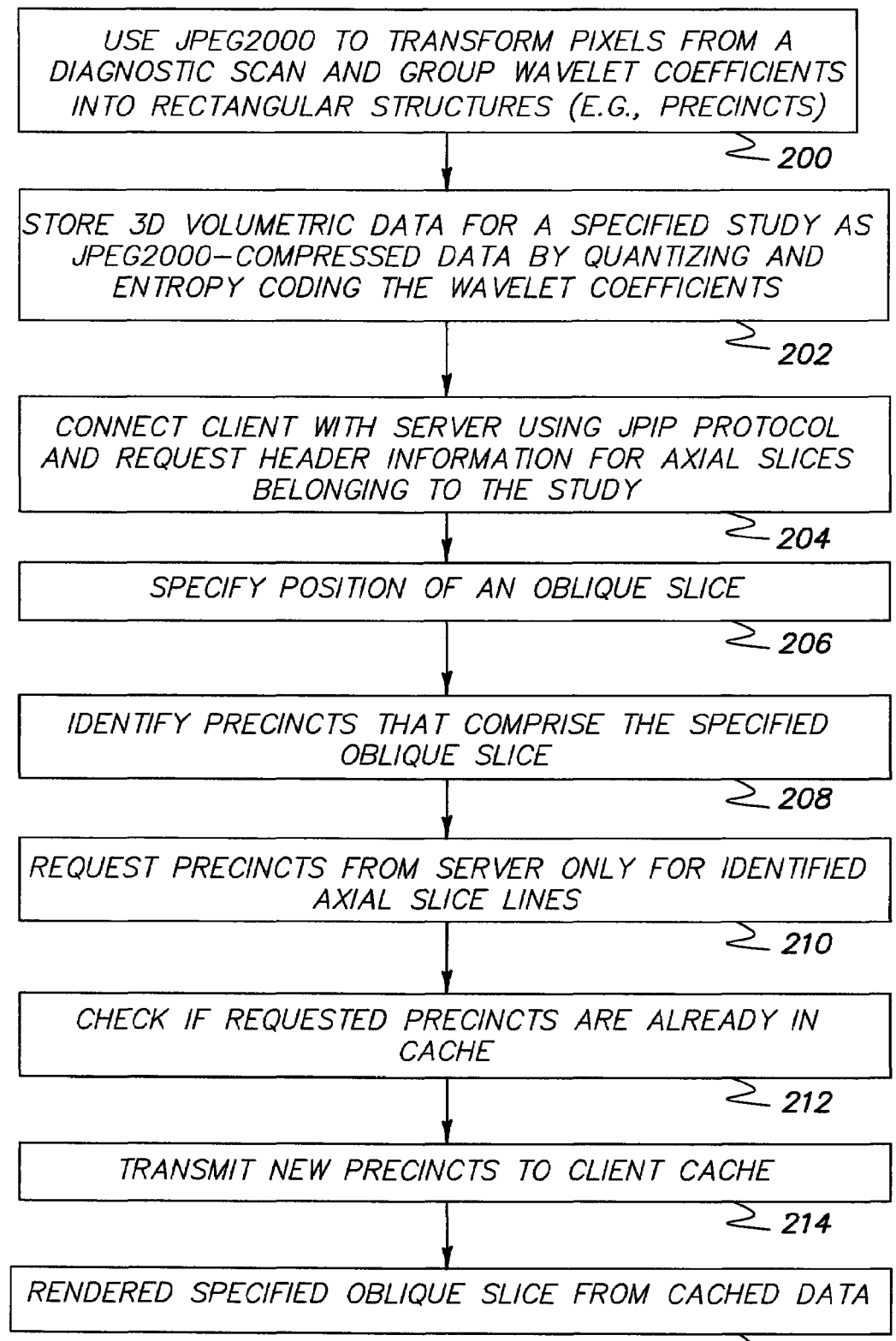
FIG. 7 shows a flow chart for the operation of the client-server system shown in FIG. 4 according to the invention.

FIG. 7 shows the operation of the presently disclosed client-server system, as shown in FIG. 4, in greater detail. In a JPEG2000 procedure, the image pixels from a diagnostic scan are transformed (in a transform block 200) using the wavelet transform. The wavelet coefficients are grouped into rectangular structures such as codeblocks and precincts, where a precinct contains one or more codeblocks. A principal idea behind the client-server system according to the invention is to identify the precincts that are needed to render a desired oblique slice. After the transform step 200, the presently disclosed client-server system performs the following steps, referring now to both FIGS. 4 and 7:

In a server-based storage step 202, the server 110 stores 3D volumetric data in a JPEG2000-compressed form for axial slices from one or more specified studies. As described in section 1, this is accomplished by quantizing and entropy coding the wavelet coefficients, grouped into codeblocks, that are produced by the transform block 200. The compression can be lossy or lossless. All the axial slices can be compressed as individual images or as multiple components of a single image. In the preferred embodiment, the second approach is adopted because it results in less header information per slice. Also, a decorrelating transform, such as a wavelet transform, may be applied in the axial direction before JPEG2000 compression.

The client 130 establishes a connection with the server 110 over the network 140 using the JPIP protocol in a JPIP protocol step 204 and requests the header information for an image. The image components comprise axial slices belonging to a single study. The server 110 transfers the requested header information to the client 130 over HTTP or TCP, depending on the type of JPIP connection that was requested. The header contains useful information regarding each axial slice, such as slice size, bit-depth, codeblock and precinct sizes, number of wavelet decomposition levels, etc.

In an oblique slice specification step 206, the end user specifies the positioning of a desired oblique slice within the 3D volume represented by the volumetric data. This is typically accomplished through the graphical user interface (GUI) 160 and a pointing device (not shown) such as a mouse or a joystick. Those skilled in the art will recognize that it is possible to derive the exact positioning of the slice through other means. For example, the client may determine the default position of the initial oblique slice based on exam type (chest CT, brain MRI, abdominal CT etc.). In this case the end user does not directly specify the exact position of the oblique slice.

In a precinct identification step 208, the client 130 performs the calculation described above in sections 2.1 through 2.2 to determine the precincts that are necessary for rendering the oblique slice.

In a precinct request step 210, the client 130 sends a request to the server 110 for compressed data representing the precincts that have been tagged as necessary by the previous step. This is accomplished by using the "model=" field in JPIP as follows. For example, in a cache checking step 212, if "model=" field contains the "Bin-Id" for a particular precinct, the server 110 assumes that that particular precinct is already present in the client cache 150, and hence skips transmission of that precinct. The client specifies the entire image at full resolution as the 'view-window'. At the same time, by using the 'model=' field, it notifies the server of all of the precincts that have been tagged as 'not necessary' for rendering the presently specified oblique slice, resulting in their non-transmission by the server. The client also uses the 'model=' field to signal any precincts that has been tagged as 'necessary' but are already present in the cache memory.

In a precinct transmission step 214, compressed data representing the precincts needed for rendering the presently specified oblique slice are transmitted to the client 130, and the compressed data received from the server 110 is cached in the cache 150 so that it can be used for rendering the presently specified oblique slice and re-used in case the end-user changes the position of an oblique slice. In the preferred embodiment, only compressed data belonging to the new ("necessary") precincts (those precincts not already present in the client cache 150) are transmitted to the client 130, and the compressed data received from the server 110 is cached in the cache 150 so that it can be used for the presently specified slice and for additional slices that may be requested. The server is free to send the data corresponding to the precincts identified as necessary in any order. For example, in a preferred embodiment, the compressed data is transmitted in a quality progressive manner. That is, for all the precincts tagged as 'necessary', compressed data corresponding to the $1^{st}$ quality layer is transmitted first. This is followed by compressed data from the $2^{nd}$ quality layer and so on. In an alternate embodiment, the server could transmit all the compressed data corresponding to one precinct before proceeding to the next precinct.

In an oblique slice rendering step 216, the rendering engine 170 periodically renders an oblique slice from the cached data. Only the cached data necessary for a particular rendering is decompressed. This is accomplished by identifying the codeblocks that are necessary for rendering the oblique slice.

Before all of the compressed data necessary to render a particular oblique slice is received by the client 130, the end user may select a different position for the oblique slice. In that case, the already-received data stays in the cache 150. The client 130 recalculates the precincts necessary to render the new oblique slice and sends a new request to the server 110.

In case of data sets with large number of slices and high resolution, the bandwidth required to signal information about the precincts that have been tagged as 'not necessary' using the 'model=' field starts becoming significant. It is possible to alleviate this problem by signaling the precincts tagged as 'necessary' using the 'need=' field in JPIP instead of using the 'model=' field to signal the precincts that are tagged as 'not necessary' as described above. Initially, the client opens a stateless session and after receiving header information, sends a request to the server. The request contains a 'need=' field with indices of precincts that have been tagged as 'necessary'. If the end-user selects a different oblique slice, the client issues a new stateless request using the 'need=' field for precincts that are not present in the client-cache and that have been tagged as 'necessary'. This approach is usually more efficient than using the 'model=' field because the number of precincts tagged as 'necessary' is typically much less than the number of precincts tagged as 'not necessary'. As more data accumulates in the cache, this advantage becomes more pronounced.

Comparing the presently-disclosed architecture with the client-centric architecture, it can be seen that, as more compressed data is received and cached, the memory and computational power requirements for the two architectures become similar. But in the disclosed architecture, the compressed data is obtained only on an as-needed basis. Thus, if the end user were interested in a single oblique slice, the client 130 would request only the precinct data necessary to render that particular oblique slice but would not request any additional data. Also, the order in which the compressed data is transmitted from the server 110 to the client 130 is dependent upon the order in which different oblique slices are requested by the end user. Thus, this architecture is more responsive to the wishes of the end user. On the other hand, since the client 130 can only request data at precinct granularity, this architecture is less efficient than the server-centric architecture in terms of bandwidth. For a single slice request, the server-centric architecture makes optimum use of the bandwidth. Server-centric architecture also makes very few demands on the client 130 in terms of memory and computational power. But the main drawback of the server-centric architecture is that, in case of multiple requests, the data transmitted in response to previous requests cannot be reused. Also, the server 110 might be able to service only a limited number of clients because of the heavy computational load.

In an alternative embodiment of the invention, the calculation to determine the precincts that are necessary for rendering the oblique slice, e.g., the calculations described in section 2, can be performed by the server. For this server-based calculation, the client needs to signal the equation of the oblique slice to the server, e.g., by using the method described in section 2.2 to identify the oblique slice plane. This signaling can be accomplished by using the 'vendor-capability' field from the 'client capability and preference request fields'. In this scenario, the server needs to maintain a model of the client cache in order to determine which precincts should be transmitted.

It is furthermore important to note that this alternative embodiment of the invention shares the processing load for the oblique slice between the server and the client, and thus differs from either a conventional server-centric process or a conventional client-centric process. For instance, in a conventional server-centric process employing JPEG2000 compression, the client requests an oblique slice and the server then would decompress the JPEG2000 compressed data in its store, render the oblique slice data from the decompressed data, apply JPEG2000 compression to the oblique slice data, and then send the precinct data for the oblique slice to the client. However, this precinct data received by the client in the server-centric system is not the same precinct data as received by the client according to the alternative embodiment of the present invention, even for the same oblique slice. More specifically, the server-based calculation according to the alternative embodiment would determine which precincts for the axial slices are necessary for rendering the oblique slice requested by the client. Then the server would send this precinct data for the axial slices to the client, where it is stored in the cache memory 150, and the client would render the oblique slice from this precinct data. One should also be mindful that one of the significant advantages of the invention is that the compressed data received from the server 110 for the axial slices is cached in the cache memory 150 so that it can be used not only for rendering the presently specified slice but also for rendering additional oblique slices as they are later requested.

4. Simulation Results.

A scenario involving multiple oblique slices demonstrates the advantage of the disclosed architecture over the client-centric architecture. This scenario starts, for example, with a head CT sequence from the "University of North Carolina Volume Rendering Test Data Set" archive available via ftp from ftp.cs.unc.edu in the directory/pub/projects/image/CH-VRTD/volII. The sequence contains 113 slices of size 256× 256. The CT sequence was compressed losslessly using JPEG2000 and stored at the JPIP server. In this example, the implementation of the client was based on the aforementioned Kakadu software. All the slices were treated as multiple components of a single image. The file size of the losslessly compressed image was 4.786 MegaBytes (MB).

This scenario simulated a situation where the client makes multiple requests for oblique slices. All the oblique slices passed through the center of the volume and their normals were in the YZ plane. The table in FIG. 8 shows the savings in the transmitted bytes with the presently disclosed architecture. The first column of the table lists the angle subtended by the slice-normal to the Z-axis. The third and second columns of the table list the number of Kilobytes (KB) that are needed to be transmitted by the server with and without using information stored in the client cache, respectively. As expected, when the client cache is not being used, each oblique slice requires roughly the same amount of data (25%) to be transmitted by the server. Since the cache is empty in the beginning, use of the cache makes no difference for the first slice request. But from that point on, using client-side cache proves to be much more efficient. If the client-centric architecture were being used instead of the proposed server-centric architecture, the entire 4.786 MB of compressed data would have to be sent to the client before any rendering could begin.

Consequently, and according to the presently disclosed invention, a client-server architecture renders oblique slices through 3D volumetric data stored remotely at the server. This architecture resembles a client-centric architecture but is more responsive to the requests from the end user. This is accomplished by transmitting data on an as-needed basis and prioritizing the order of data transmission based on the input from the end user. The 3D volumetric data is stored at the server in a JPEG2000-compressed form. The client uses the JPIP protocol for obtaining JPEG2000-compressed data from the server. In JPEG2000, the wavelet coefficients are further partitioned into smaller structures, such as codeblocks. Based on the positioning of the oblique slice, compressed data from only certain codeblocks and precincts is needed to render the slice. The client communicates this information to the server using the 'model=' field or the 'need=' field in a JPIP client request so that the server can minimize bandwidth by transmitting only relevant precinct data-bins. It was demonstrated that the use of caching on the client side further reduces the bandwidth requirements. Finally, simulation results quantify the bandwidth savings for rendering a series of oblique slices.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 pre-processing unit
20 discrete wavelet transform (DWT) unit
30 uniform dead zone quantizer
40 entropy coder
50 packet formation and bit-stream organization unit
110 server
120 storage media
130 client
140 network
150 cache
160 graphical user interface
170 interpolation and rendering machine
200 transform step
202 server storage step
204 JPIP protocol step
206 oblique slice specification step
208 precinct identification step
210 precinct request step
212 cache checking step
214 precinct transmission step
216 oblique slice rendering step

What is claimed is:

1. A system for rendering an oblique slice through volumetric data accessed via a network using a client-server architecture, the system comprising:
    a server for processing and storing volumetric data comprising axial slices obtained from a diagnostic scanning system;
    a client for processing user requests related to specific views of the volumetric data;
    a network protocol for connecting the client with the server over the network and obtaining data from the server for use by the client;
    a processing stage at the client for specifying an oblique slice responsive to user input and communicating particulars of the oblique slice to the server, thereupon obtaining axial slice data from the server specifically for portions of the axial slices that are needed to render the oblique slice;
    memory at the client for storing the axial slice data; and
    a rendering stage at the client for rendering the oblique slice from the axial slice data in the memory.

2. The system as claimed in claim 1 wherein the processing stage at the client specifies a position of the oblique slice, identifies portions of the axial slices that are needed to render the oblique slice, and requests needed axial slice data from the server specifically comprising the portions of the axial slices identified by the client that are needed to render the oblique slice.

3. The system as claimed in claim 1 wherein the processing stage at the client generates an equation of a plane comprising the oblique slice and communicates the equation of the plane to the server, which identifies portions of the axial slices that are needed to render the oblique slice, whereby the client then obtains the portions of axial slices from the server.

4. The system as claimed in claim 1 further comprising a stage for determining if any of the axial slice data is already stored in the memory at the client, whereby the processing stage thereupon obtains only new axial slice data that is not already in the memory and the rendering stage utilizes both the new axial slice data and the axial slice data already stored in the memory.

5. The system as claimed in claim 1 wherein the server uses JPEG2000 compression to transform the data from the diagnostic scanning system into wavelet coefficients that are grouped into rectangular structures.

6. The system as claimed in claim 5 wherein the processing stage at the client identifies wavelet coefficients in the axial slices that are needed to render the oblique slice, and requests needed compressed data from the server comprising the wavelet coefficients of the axial slices that are needed to render the oblique slice.

7. The system as claimed in claim 6 wherein the rectangular structures comprise subbands including precincts and the processing stage requests needed compressed data belonging to the precincts corresponding to the portions of the axial slices that are needed to render the oblique slice.

8. The system as claimed in claim 1 wherein the processing stage at the client for specifying an oblique slice specifies the oblique slice responsive to user input.

9. The system as claimed in claim 5 wherein the network protocol is a JPIP protocol associated with JPEG2000-compressed data.

10. The system as claimed in claim 9 wherein a "model=" field of the JPIP protocol is used to notify the server of all precincts that have been tagged as "not necessary" as well as all precincts which have been tagged as "necessary" but already stored in the memory, resulting in their non-transmission by the server.

11. The system as claimed in claim 9 wherein a "need=" field of the JPIP protocol is used to notify the server of all precincts that have been tagged as "necessary" but are not stored in the memory, resulting in their transmission by the server.

12. A method for rendering oblique slices through volumetric data accessed via a network using a client-server architecture, the method comprising the steps of:
    processing and storing volumetric data at the server comprising axial slices obtained from a diagnostic scanning system;
    connecting the client with the server over the network according to a network protocol and obtaining data from the server for use by the client;

specifying an oblique slice at the client and communicating particulars of the oblique slice to the server;
identifying portions of the axial slices that are needed to render the oblique slice;
obtaining needed data from the server specifically for the portions of the axial slices that are needed to render the oblique slice;
storing the needed data in memory at the client; and
rendering the oblique slice at the client from the needed data in the memory.

13. The method as claimed in claim 12 wherein the identifying steps occurs at the client.

14. The method as claimed in claim 12 wherein the identifying step occurs at the server.

15. The method as claimed in claim 12 further comprising the steps of determining if any of the needed data is already stored in the memory at the client and transmitting only new needed data that is not already in the memory, whereby the step of rendering utilizes both new needed data and needed data already stored in the memory.

16. A method for rendering oblique slices through volumetric data accessed via a network using a client-server architecture, whereby JPEG2000 compression is used to transform the volumetric data into wavelet coefficients that are grouped into precincts, the method comprising the steps of:
processing and storing JPEG2000-compressed volumetric data at the server, wherein the volumetric data comprises axial slices obtained from a diagnostic scanning system;
connecting the client with the server over the network according to a JPIP protocol;
specifying an oblique slice within the volumetric data;
identifying wavelet coefficients in the axial slices that are needed to render the oblique slice;
requesting compressed data belonging to specific precincts from the server, wherein the specific precincts include the wavelet coefficients that are needed to render the oblique slice, whereby the specifying, identifying and requesting steps occur at the client;
storing compressed data belonging to the specific precincts in memory at the client; and
rendering the oblique slice from the wavelet coefficients included in the compressed data belonging to the specific precincts in the memory.

17. The method as claimed in claim 16 further comprising the steps of determining if any of the requested precincts are already stored in the memory at the client and transmitting only compressed data belonging to new precincts that are not already in the memory, whereby the step of rendering utilizes compressed data belonging to both new precincts and precincts already stored in the memory.

18. The method as claimed in claim 17 wherein a "model=" field of the JPIP protocol is used to notify the server of all precincts that have been tagged as "not necessary" as well as all precincts which have been tagged as "necessary" but already stored in the memory, resulting in their non-transmission by the server.

19. The method as claimed in claim 17 wherein a "need=" field of the JPIP protocol is used to notify the server of all precincts that have been tagged as "necessary" but are not stored in the memory, resulting in their transmission by the server.

20. A method for rendering oblique slices through volumetric data accessed via a network using a client-server architecture, whereby JPEG2000 compression is used to transform the volumetric data into wavelet coefficients that are grouped into precincts, the method comprising the steps of:
processing and storing JPEG2000-compressed volumetric data at the server, wherein the volumetric data comprises axial slices obtained from a diagnostic scanning system;
connecting the client with the server over the network according to a JPIP protocol;
specifying an oblique slice within the volumetric data;
deriving an equation of a plane that contains the oblique slice;
utilizing the equation to identify wavelet coefficients in the axial slices that are needed to render the oblique slice;
obtaining compressed data belonging to specific precincts from the server, wherein the specific precincts include the wavelet coefficients that are needed to render the oblique slice, whereby the specifying and deriving steps occur at the client and the utilizing step occurs at the server;
storing the compressed data belonging to the specific precincts in memory at the client; and
rendering the oblique slice from the wavelet coefficients included in the compressed data belonging to the specific precincts in the memory.

21. The method as claimed in claim 20 further comprising the steps of determining if any of the requested precincts are already stored in the memory at the client and transmitting only compressed data belonging to new precincts that are not already in the memory, whereby the step of rendering utilizes compressed data belonging to both new precincts and precincts already stored in the memory.

22. The method as claimed in claim 20 wherein a "model=" field of the JPIP protocol is used to notify the server of all precincts that have been tagged as "not necessary" as well as all precincts which have been tagged as "necessary" but already stored in the memory, resulting in their non-transmission by the server.

23. The method as claimed in claim 20 wherein a "need=" field of the JPIP protocol is used to notify the server of all precincts that have been tagged as "necessary" but are not stored in the memory, resulting in their transmission by the server.

24. A computer program product having at least one computer storage medium having instructions stored therein causing one or more computers to perform the method of claim 12.

25. A computer program product having at least one computer storage medium having instructions stored therein causing one or more computers to perform the method of claim 16.

26. A computer program product having at least one computer storage medium having instructions stored therein causing one or more computers to perform the method of claim 20.

* * * * *